(12) United States Patent
Li

(10) Patent No.: US 11,447,205 B2
(45) Date of Patent: Sep. 20, 2022

(54) VEHICLE FRAME

(71) Applicant: Yueh-Han Li, Taitung County (TW)

(72) Inventor: Yueh-Han Li, Taitung County (TW)

(*) Notice: Subject to any disclaimer, the term of this patent is extended or adjusted under 35 U.S.C. 154(b) by 43 days.

(21) Appl. No.: 16/738,105

(22) Filed: Jan. 9, 2020

(65) Prior Publication Data

US 2020/0231243 A1   Jul. 23, 2020

(30) Foreign Application Priority Data

Jan. 17, 2019  (TW) .................................. 108101838

(51) Int. Cl.
  *B62K 19/30*  (2006.01)
  *B62K 11/04*  (2006.01)
  *B62J 23/00*  (2006.01)

(52) U.S. Cl.
  CPC ............. *B62K 19/30* (2013.01); *B62J 23/00* (2013.01); *B62K 11/04* (2013.01)

(58) Field of Classification Search
  CPC ........ B62K 19/30; B62K 19/40; B62K 11/00; B62K 11/02; B62K 11/04; B62K 11/06; B62J 25/00
  See application file for complete search history.

(56) References Cited

U.S. PATENT DOCUMENTS

| | | | | |
|---|---|---|---|---|
| 1,118,679 A | * | 11/1914 | Pawsat | B62J 25/00 280/291 |
| 3,794,353 A | * | 2/1974 | Oliver | B62J 25/00 280/291 |
| 4,546,993 A | * | 10/1985 | Walker | B62J 25/00 280/291 |
| 7,104,157 B1 | * | 9/2006 | Hilliard | B62J 25/00 280/291 |
| 9,132,877 B2 | * | 9/2015 | Larson | B62J 25/00 |
| 2016/0297493 A1 | * | 10/2016 | Lacasse-Jobin | B62M 17/00 |

* cited by examiner

*Primary Examiner* — Minnah L Seoh
*Assistant Examiner* — Michael R Stabley

(57) ABSTRACT

A vehicle frame includes a frame body that includes a front wheel connecting member, a rear wheel connecting member, and a backbone member interconnecting the front and rear wheel connecting members and having a plurality of backbone sections interconnected to each other, and a coupling device that includes a plurality of first coupling members, each of which is mounted to a corresponding one of the backbone sections and is operable to switch between a mobile state and a stationary state. Each of the first coupling members is movable along the corresponding one of the backbone sections in the mobile state, and is immobilized relative to the corresponding one of the backbone sections in the stationary state.

10 Claims, 6 Drawing Sheets

VEHICLE FRAME

CROSS-REFERENCE TO RELATED APPLICATION

This application claims priority of Taiwanese Patent Application No. 108101838, filed on Jan. 17, 2019.

FIELD

The disclosure relates to a vehicle, and more particularly to a vehicle frame.

BACKGROUND

A conventional motorcycle includes a vehicle frame and a vehicle shell covering exterior of the vehicle frame. Vehicle shells are catered toward different needs (e.g., reduced aerodynamic drag for racing motorcycles, increased ventilation capability for off-road motorcycles, etc.). While racing and off-road motorcycles may use the same type of vehicle frame, one type of vehicle frame may be incompatible to support different types of vehicle shells.

SUMMARY

Therefore, an object of the disclosure is to provide a vehicle frame that can alleviate the drawback of the prior art.

According to one aspect of the disclosure, the vehicle frame is for mounting a front wheel set, a rear wheel set, and at least one vehicle accessory. The vehicle frame includes a frame body and a coupling device.

The frame body includes a front wheel connecting member for mounting the front wheel set, a rear wheel connecting member disposed behind the front wheel connecting member for mounting the rear wheel set, and a backbone member interconnecting the front and rear wheel connecting members and having a plurality of backbone sections interconnected to each other.

The coupling device includes a plurality of first coupling members for mounting the at least one accessory. Each of the first coupling members is mounted to a corresponding one of the backbone sections, and is operable to switch between a mobile state and a stationary state. Each of the first coupling members is movable along the corresponding one of the backbone sections in the mobile state, and is immobilized relative to the corresponding one of the backbone sections in the stationary state.

According to another aspect of the disclosure, the vehicle frame for mounting a rear wheel set and a front wheel set includes a frame body, a coupling device and at least one accessory member.

The frame body includes a front wheel connecting member for mounting the front wheel set, a rear wheel connecting member disposed behind the front wheel connecting member and having a front end connected to the front wheel connecting member and a rear end for mounting the rear wheel set, and a backbone member having a front backbone end connected to the front wheel connecting member, a rear backbone end connected to the rear end of the rear wheel connecting member, and a plurality of backbone sections interconnected to each other between the front and rear backbone ends.

The at least one vehicle accessory has a plurality of accessory fasteners.

The coupling device is for mounting the at least one vehicle accessory on the frame body, and includes a plurality of first coupling members each mounted to one of the backbone sections.

Each of the first coupling members has a first sleeve half, a second sleeve half cooperating with the first sleeve half to sleeve around the corresponding one of the backbone sections, a fastening portion connected to the first sleeve half, and a plurality of screw sets that are connected to the first and second halves to fasten the same together.

The accessory fasteners are interlocked respectively with the fastening portions of the first coupling members.

When the screw sets are set loose, each of the first coupling members is slidable along and changeable in position on the corresponding one of the backbone sections so as to be aligned and interlocked with a respective one of the accessory fasteners.

When the screw sets (214) are tightened up, each of the first coupling members is immobilized, and the at least one vehicle accessory is positioned to the backbone member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
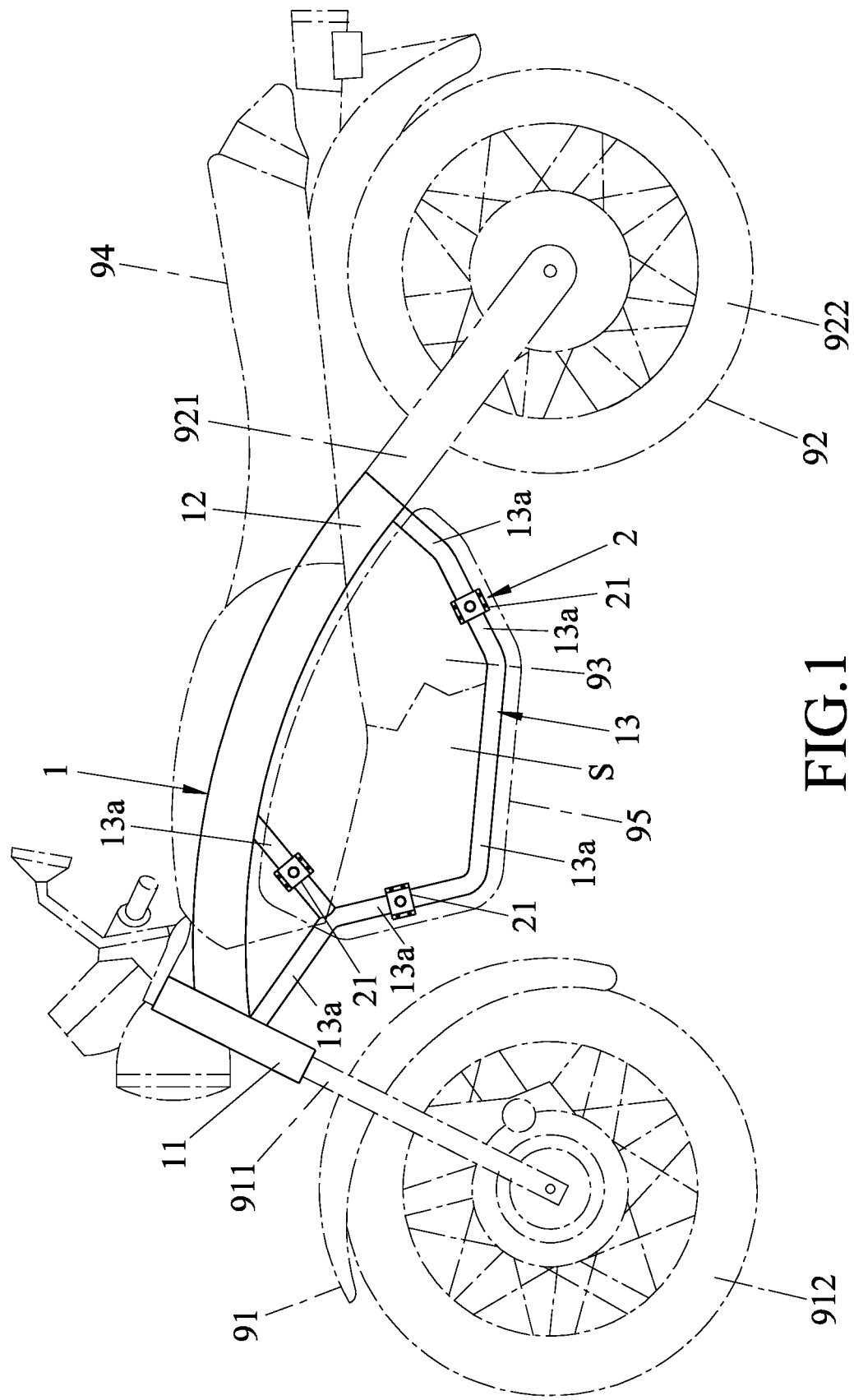
FIG. 1 is a schematic view showing a motorcycle incorporating a first embodiment of a vehicle frame according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
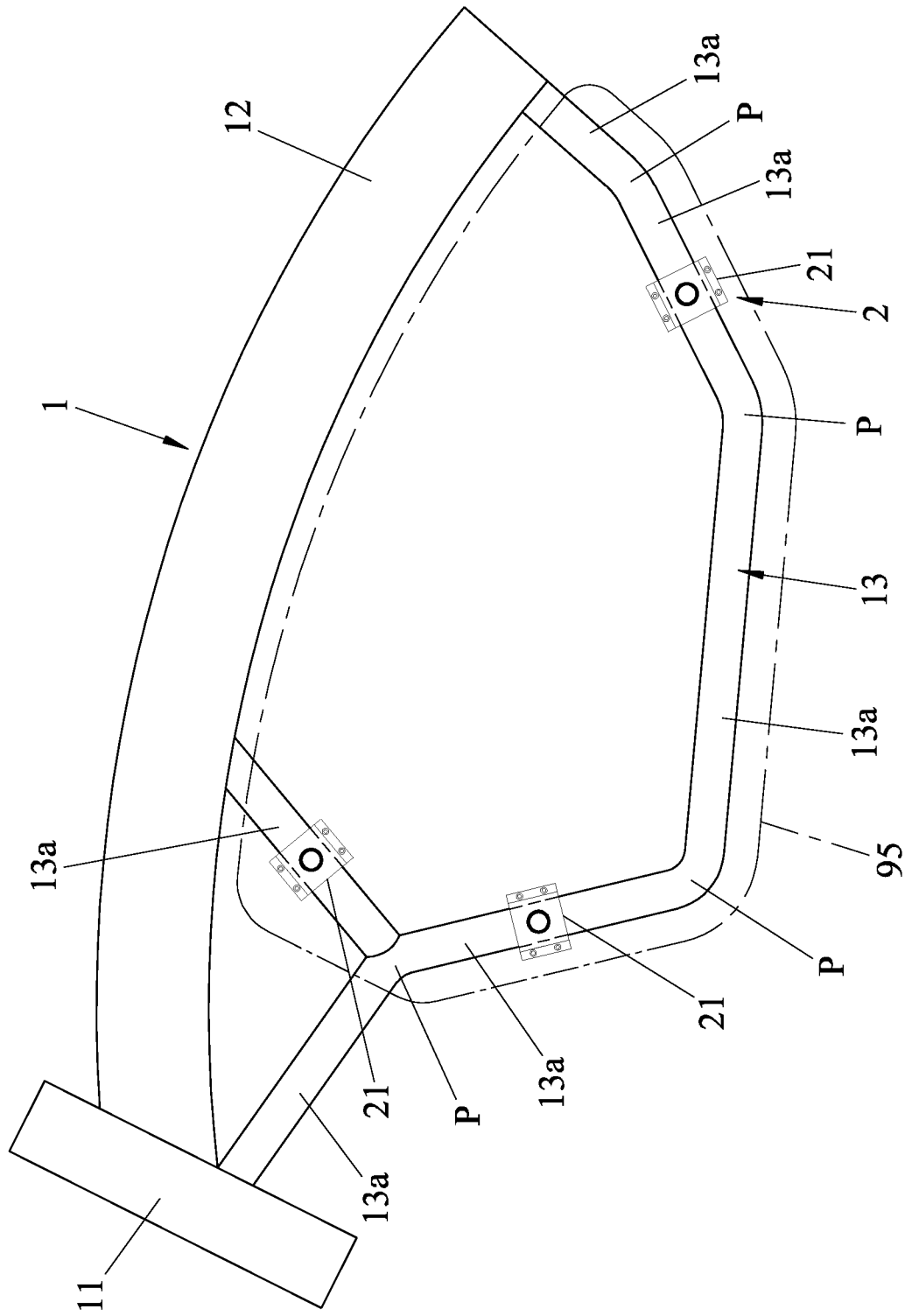
FIG. 2 is a view illustrating the first embodiment.
Figure 3:
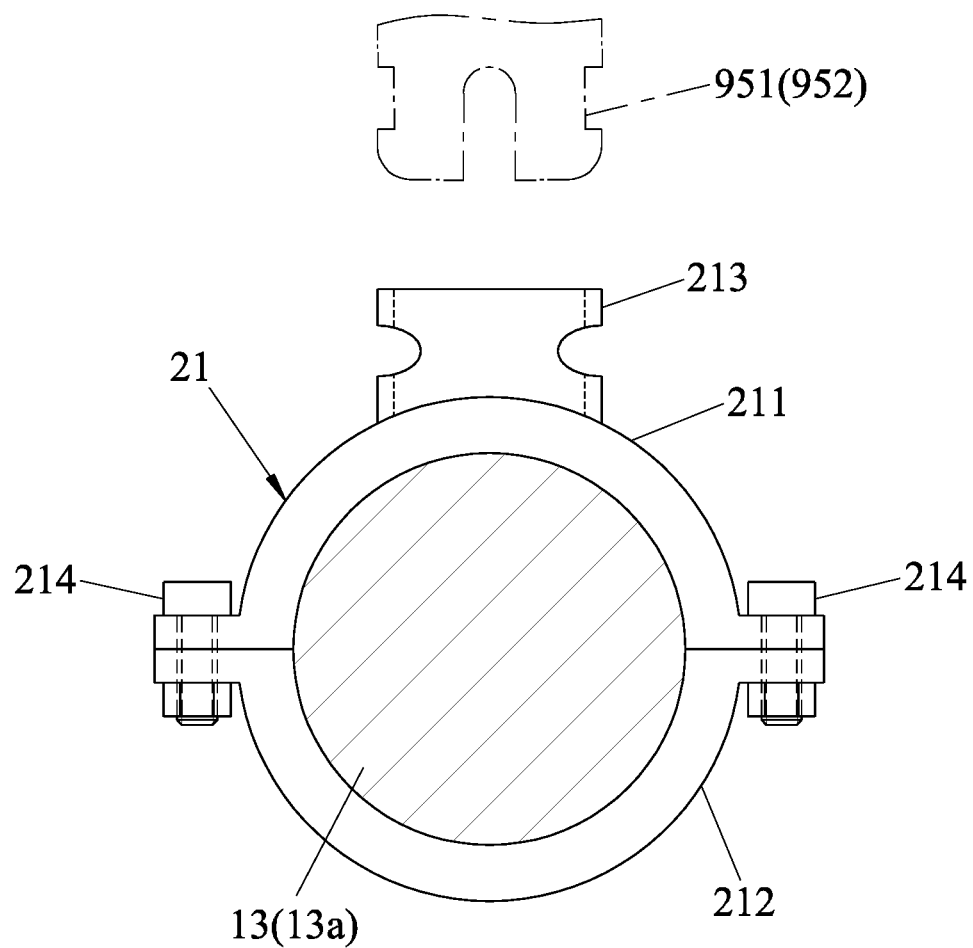
FIG. 3 is a partly sectional view of a backbone member and a first coupling member mounted thereon.

Referring to FIGS. 1 to 3, a first embodiment of a vehicle frame according to the disclosure is adapted for mounting a front wheel set 91, a rear wheel set 92, an engine 93, a seat 94, and an accessory 95. The front wheel set 91 includes a front wheel support 911, and a front wheel 912 mounted to the front wheel support 911. The rear wheel set 92 includes a rear wheel support 921, and a rear wheel 922 mounted to the rear wheel support 922.

It should be noted that the accessory 95 in the first embodiment is a vehicle shell, and has three accessory fasteners 951 adapted for mounting the vehicle shell to the vehicle frame, but is not restricted to such. Referring specifically to FIG. 3, in the embodiment, each of the accessory fasteners 951 has a resilient barb element 952, but may be different in other embodiments. The accessory 95 may also be a plurality of vehicle shells, or other types of accessories (such as storage box, battery cells, and bottle holder). In addition, the vehicle frame of the first embodiment is a motorcycle frame, but may be other types of vehicle frames (such as bicycle frame).

The vehicle frame of the first embodiment includes a frame body 1 and a coupling device 2. The frame body 1 includes a front wheel connecting member 11 for mounting the front wheel support 911 of the front wheel set 91, a rear wheel connecting member 12 disposed behind the front wheel connecting member 11 for mounting the rear wheel support 921 of the rear wheel set 92, and a backbone member 13 interconnecting the front and rear wheel connecting members 11, 12. The backbone member 13 has a plurality of backbone sections 13a interconnected to each other. Each of the backbone sections 13a extends along an axis thereof. The axes of the backbone sections 13a are inclined with each other.

The backbone sections 13a includes a group of the backbone sections 13a consecutively interconnected to each other to form a main backbone part and defining a plurality of connection points (P), each of which is formed between two adjacent ones of the backbone sections 13a of the group. In the first embodiment, five of the backbone sections 13a are in the abovementioned group. The main backbone part of the backbone member 13 has front and rear backbone ends respectively connected to the front and rear wheel connecting members 11, 12 and cooperates with the front and rear wheel connecting members 11, 12 to define a vehicle body area (S) thereamong. One of the backbone sections 13a other than the abovementioned group of the backbone sections 13a has two opposite ends respectively connected to the rear wheel connecting member 12 and one of the connection points (P) of the abovementioned group of the backbone sections 13a. It should be noted that design aspects such as number, size and angle of the backbone sections 13a are well known in the field and will not be discussed hereinafter. In the first embodiment, a total of six backbone sections 13a are in the backbone member 13. The coupling device 2 includes three first coupling members 21 for mounting the vehicle accessory 95. Each of the first coupling members 21 is mounted to a corresponding one of the backbone sections 13a, and has a first sleeve half 211, a second sleeve half 212 that is connected to the first sleeve half 211 to cooperatively sleeve around a corresponding one of the backbone sections 13a, a fastening portion 213 that is connected to the first sleeve half 211 and that is adapted to be coupled to one of the accessory fasteners 951 of the vehicle accessory 95, and a plurality of screw sets 214 that are threadedly mounted to the first and second halves 211, 212.

Referring specifically to FIG. 3, in the embodiment, each of the first and second sleeve halves 211, 212 has an arcuate middle part and two lateral flanges respectively projecting from two opposite ends of the arcuate middle part, and the screw sets 214 are attached to the lateral flange members of the first and second sleeve halves 211, 212. As such, the fastening portion 23 is a receptacle member projecting radially from the arcuate middle part of the first sleeve half 211 to receive and to interlock with the resilient barb element 952 of a corresponding one of the accessory fasteners 951. Nevertheless, actual structure of the first coupling member 21 may be varied in other embodiments.

Each of the first coupling members 21 is operable to switch between a mobile state and a stationary state. The screw sets 214 are set loose so that each of the first coupling members 21 is movable along the corresponding one of the backbone sections 13a in the mobile state, and the screw sets 214 are tightened up so that each of the first coupling members 21 is immobilized relative to the corresponding one of the backbone sections 13a in the stationary state.

As the accessory fasteners 951 of the vehicle accessory 95 are interlocked respectively with the fastening portions 213 of the first coupling member 21, once the fastening portions 213 are respectively coupled to said accessory fasteners 951, the vehicle accessory 95 is fixedly mounted to the first embodiment when the first coupling members 21 are in the stationary state. During this state, as a vehicle shell, the vehicle accessory 95 covers the vehicle body area (S). When the vehicle accessory 95 is to be switched into a new one with different size and structure, the new vehicle accessory 95 may have to be mounted at different positions on the first embodiment. However, since each of the first coupling members 21 is slidable along and changeable in position on the corresponding one of the backbone sections 13a of the backbone member 13 when the screw sets 214 are set loose in the mobile state, it may easily be realigned and interlocked with a respective one of the accessory fasteners 951 of the new vehicle accessory 95. In other words, the first embodiment is capable of accommodating vehicle accessory 95 of different sizes and structures, and the number of the first coupling members 21 used in the vehicle frame can be further altered to fully accommodate different vehicle accessories. In the first embodiment, a plurality of the coupling members 21 are used to fixedly mount the vehicle accessory 95, but may be used to fixedly mount multiple vehicle accessories 95 in other embodiments. In addition, since the first coupling members 21 are assembled together via screwing the screw sets 214, the disassembly of the first coupling members 21 is simply done by unscrewing the screw sets 214.

Figure 4:
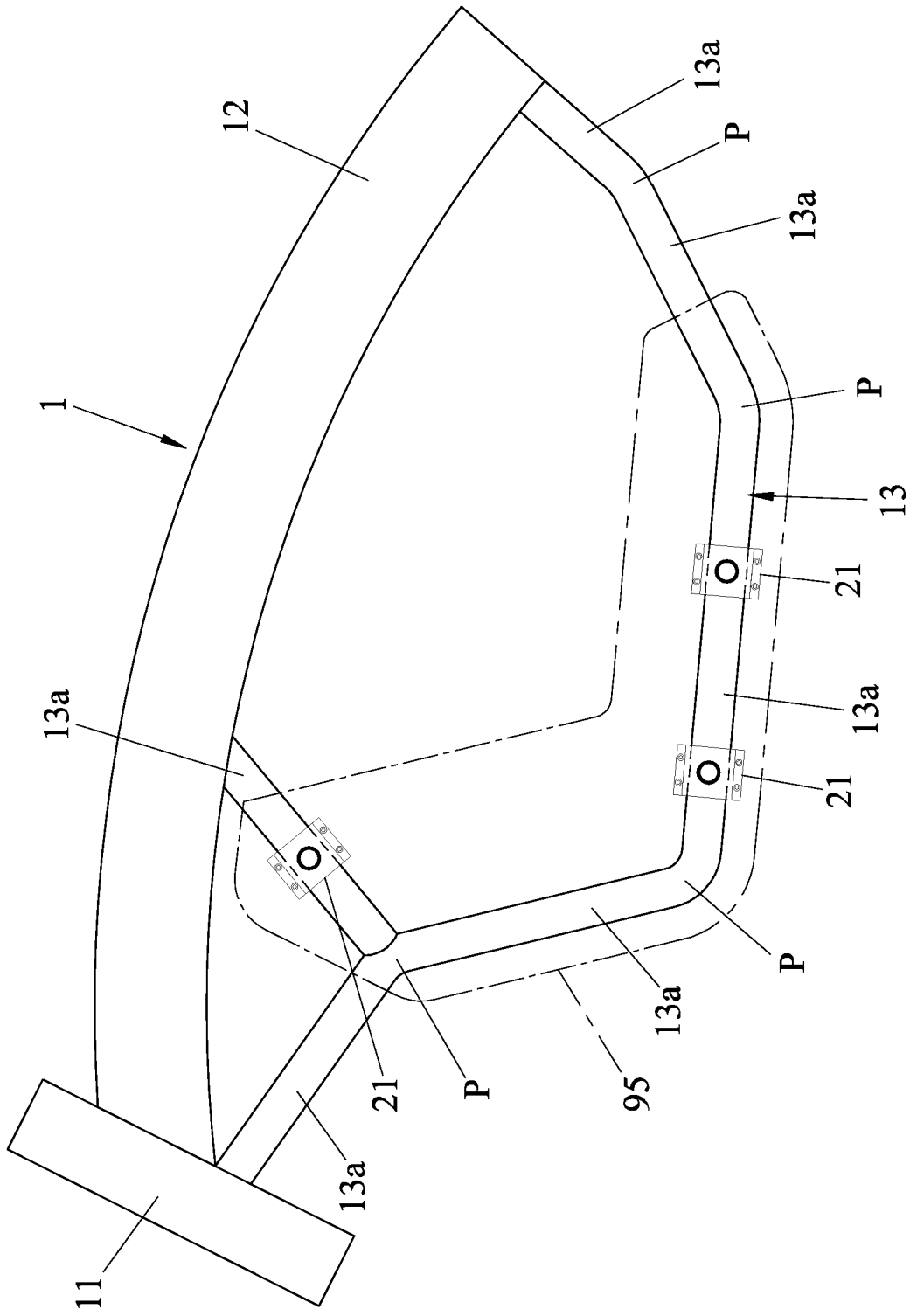
FIG. 4 is a schematic view of a second embodiment of the vehicle frame according to the disclosure.

Referring to FIG. 4, a second embodiment of the vehicle frame is similar to the first embodiment, except the following difference: two of the first coupling members 21 of the coupling device 2 are sleeved around one of the backbone sections 13a in a coaxial manner. This embodiment is capable of accommodating vehicle accessories 95 with different specifications, and offers the same benefits as that of the first embodiment.

Figure 5:
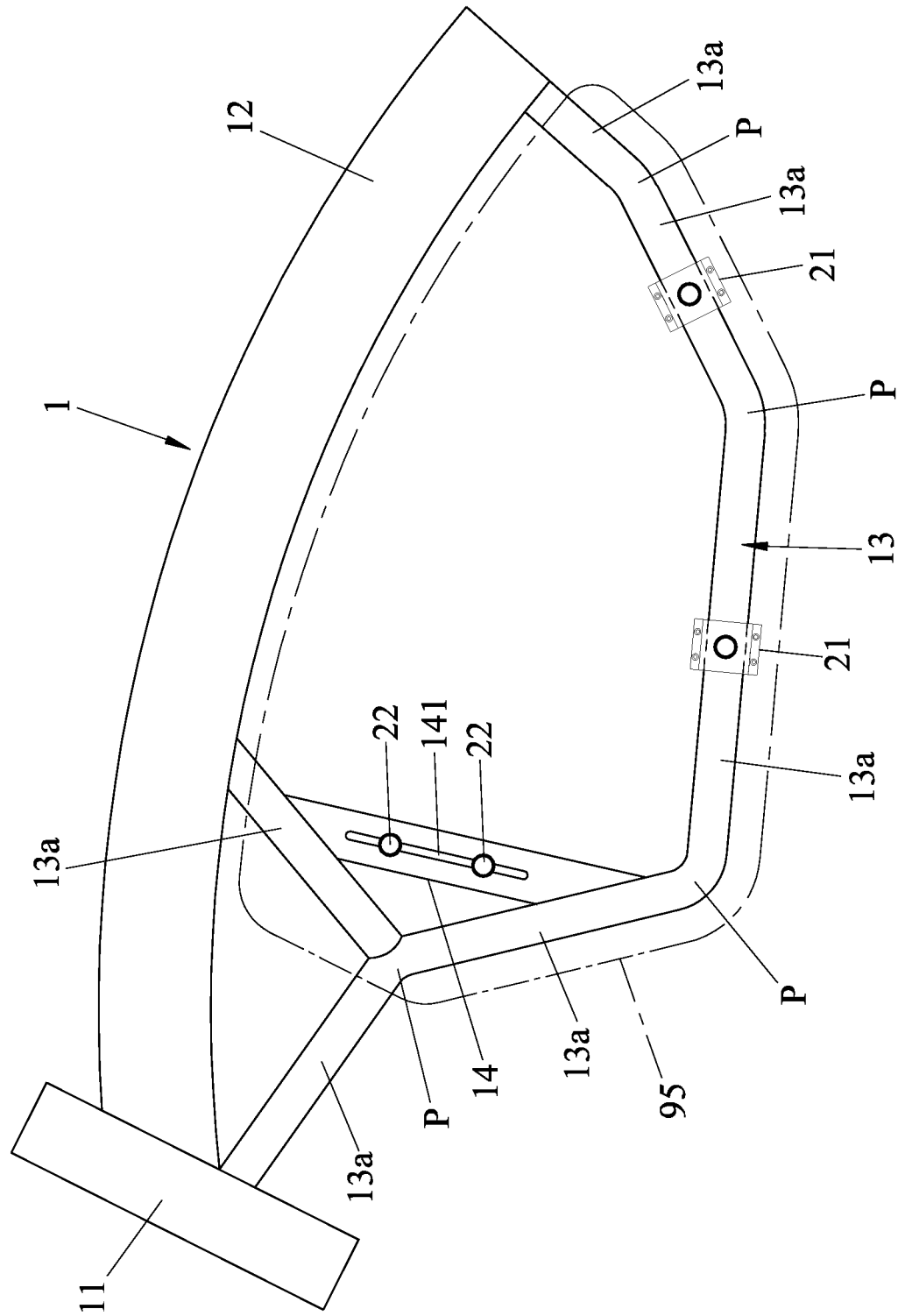
FIG. 5 is a schematic view of a third embodiment of the vehicle frame according to the disclosure.

Referring to FIG. 5, a third embodiment of the vehicle frame is similar to the first embodiment, except the following differences: The frame body 1 includes two first coupling members 21 and a first slide member 14 that interconnects two of the backbone sections 13a. The first slide member 14 has a first slide groove 141. The coupling device 2 further includes two second coupling members 22 that are mounted to the first slide groove 141 and that are configured for mounting the vehicle accessory 95. Each of the second coupling members 22 is slidable along the first slide groove 141, and is able to be immobilized relative to the first slide groove 141. Each second coupling member 22 may include, but is not limited to, a screw and a nut. Number of the second coupling members 22 may be one or more than two in other embodiments. This embodiment is capable of accommodating vehicle accessories 95 with different specifications, and offers the same benefits as that of the first embodiment.

Figure 6:
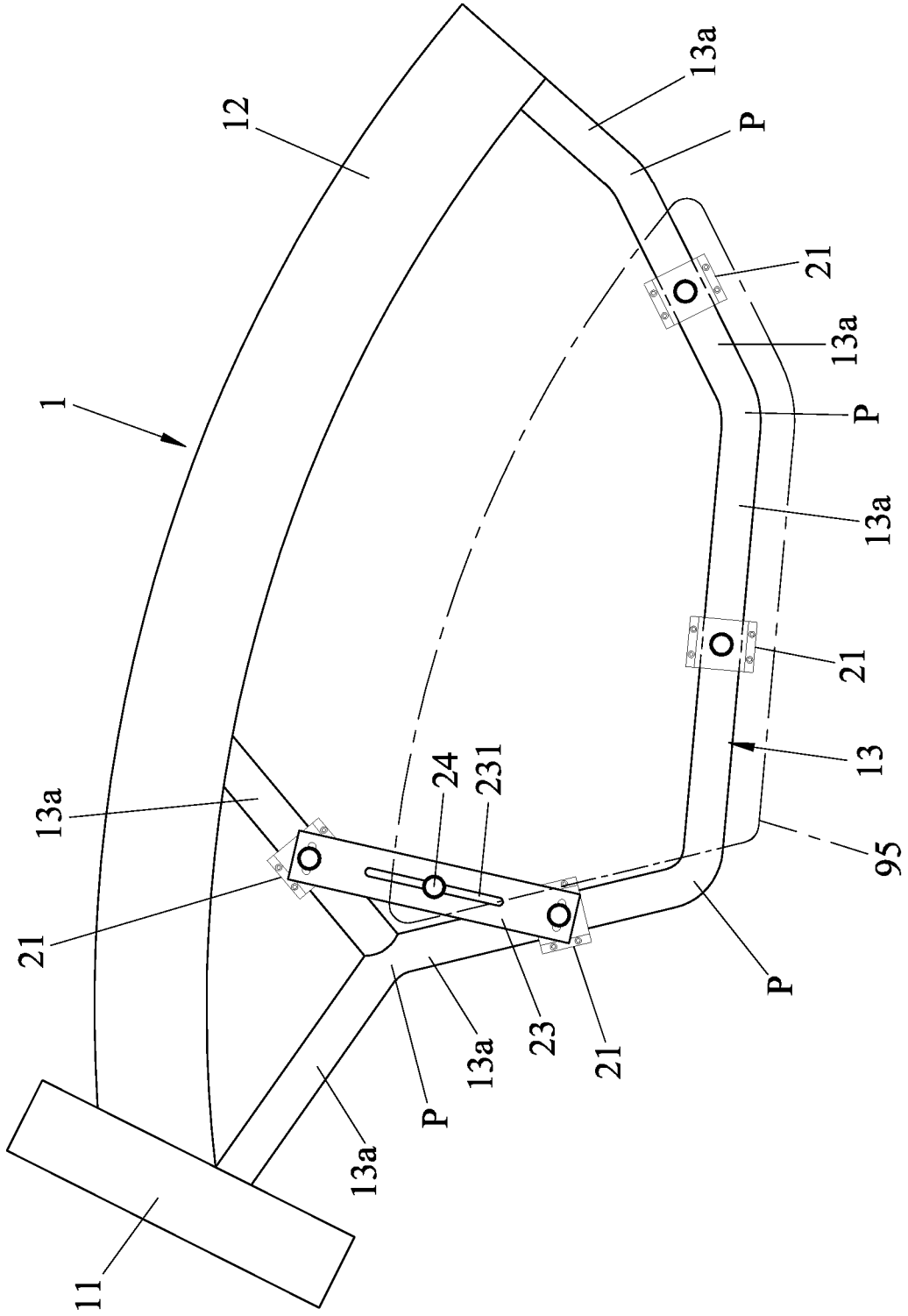
FIG. 6 is a schematic view of a fourth embodiment of the vehicle frame according to the disclosure.

Referring to FIG. 6, a fourth embodiment of the vehicle frame is similar to the third embodiment, except the following differences: The coupling device 2 includes four first coupling members 21 that are respectively sleeved onto the backbone sections 13a which have the axes thereof inclined with each other. The coupling device 2 further includes a second slide member 23 that has a second slide groove 231 and that is connected to two of the first coupling members 21, and a third coupling member 24 that is mounted to the second slide groove 231 and that is configured for mounting the vehicle accessory 95. The third coupling member 24 is slidable along the second slide groove 231, and is able to be immobilized relative to the second guiding groove 231. The third coupling member 24 may include, but is not limited to, a screw and a nut. Number of the third coupling member 23 may be more than one in other embodiments. This embodiment is capable of accommodating vehicle accessories 95 with different specifications, and offers the same benefits as that of the third embodiment.

Overall, with the implementation of a plurality of the first coupling member 21 on the vehicle frame, the vehicle frame is permitted to stably mount at least one vehicle accessory 95 thereon, regardless of its size and structure.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vehicle frame for mounting a front wheel set, a rear wheel set, and at least one vehicle accessory, said vehicle frame comprising:
   a frame body including
      a front wheel connecting member for mounting the front wheel set,
      a rear wheel connecting member disposed behind said front wheel connecting member for mounting the rear wheel set, and
      a backbone member interconnecting said front and rear wheel connecting members and having a plurality of backbone sections interconnected to each other; and
   a coupling device including at least three coupling members that are mounted to said frame body and that are non-collinearly disposed for mounting the at least one vehicle accessory;
   wherein, each of said at least three coupling members is operable to switch between a mobile state and a stationary state, each of said at least three coupling members being movable relative to said frame body in the mobile state, and being immobilized relative to said frame body in the stationary state;
   wherein said frame body further includes a fixed slide member that has a slide groove, and that interconnects two of said backbone sections;
   wherein one of said at least three coupling members is mounted to said slide groove of said fixed slide member and that is configured for mounting the at least one vehicle accessory; and
   wherein the one of said at least three coupling members is slidable along said slide groove, and is able to be immobilized relative to said slide groove.

2. The vehicle frame as claimed in claim 1, wherein:
   said backbone sections includes a group of said backbone sections consecutively interconnected to each other to form a main backbone part and defining a plurality of connection points, each of which is formed between two adjacent ones of said backbone sections of said group; and
   said main backbone part has front and rear backbone ends respectively connected to said front and rear wheel connecting members and cooperates with said front and rear wheel connecting members to define a vehicle body area thereamong.

3. The vehicle frame as claimed in claim 2, wherein:
   at least one of said backbone sections other than said group of said backbone sections has two opposite ends that are respectively connected to said rear wheel connecting member and one of said connection points of said group of said backbone sections.

4. The vehicle frame as claimed in claim 1, wherein:
   each of said backbone sections of said frame body extends along an axis thereof;
   two of said at least three coupling members of said coupling device are sleeved around one of said backbone sections in a coaxial manner.

5. The vehicle frame as claimed in claim 1, wherein:
   each of said backbone sections of said frame body extends along an axis thereof; and
   two of said at least three coupling members of said coupling device are respectively sleeved onto two of said backbone sections that have the axes thereof inclined with each other.

6. The vehicle frame as claimed in claim 1, wherein:
   each of said at least three coupling members has
      a first sleeve half,
      a second sleeve half that is connected to said first sleeve half to cooperatively sleeve around a corresponding one of said backbone sections,
      a fastening portion that is connected to said first sleeve half and that is adapted to be coupled to an accessory fastener of the at least one vehicle accessory, and
      a plurality of screw sets that are threadably mounted to said first and second halves; and
   said screw sets are set loose so that said coupling member is in the mobile state, and said screw sets are tightened up so that said coupling member is in the stationary state.

7. A vehicle frame for mounting a front wheel set, a rear wheel set, and at least one vehicle accessory, said vehicle frame comprising:
   a frame body including
      a front wheel connecting member for mounting the front wheel set,
      a rear wheel connecting member disposed behind said front wheel connecting member for mounting the rear wheel set, and
      a backbone member interconnecting said front and rear wheel connecting members and having a plurality of backbone sections interconnected to each other; and a coupling device including at least three coupling members that are mounted to said frame body and that are non-collinearly disposed for mounting the at least one vehicle accessory;

wherein each of said at least three coupling members is operable to switch between a mobile state and a stationary state, each of said at least three coupling members being movable relative to said frame body in the mobile state, and being immobilized relative to said frame body in the stationary state;

wherein each of said backbone sections of said frame body extends along an axis thereof;

wherein said coupling device further includes
two additional coupling members that are respectively sleeved onto two of said backbone sections that have the axes thereof inclined with each other, and
a movable slide member that has a slide groove and that is connected to said two additional coupling members respectively sleeved onto said two of said backbone sections which have the axes thereof inclined with each other; and wherein one of said at least three coupling members is mounted to said slide groove of said movable slide member and that is configured for mounting the at least one vehicle accessory; and wherein the one of said at least three coupling members is slidable along said slide groove of said movable slide member, and is able to be immobilized relative to said guiding groove.

8. A vehicle frame for mounting a front wheel set and a rear wheel set, said vehicle frame comprising:
a frame body including
a front wheel connecting member for mounting the front wheel set,
a rear wheel connecting member disposed behind said front wheel connecting member, and having a front end connected to said front wheel connecting member and a rear end for mounting the rear wheel set, and
a backbone member having a front backbone end connected to said front wheel connecting member, a rear backbone end connected to said rear end of said rear wheel connecting member, and a plurality of backbone sections interconnected to each other between said front and rear backbone ends;
at least one vehicle accessory having a plurality of accessory fasteners; and
a coupling device for mounting said at least one vehicle accessory on said frame body, and including at least three coupling members each mounted to one of said backbone sections,
each of said at least three coupling members having a first sleeve half, a second sleeve half cooperating with said first sleeve half to sleeve around the corresponding one of said backbone sections, a fastening portion connected to said first sleeve half, and a plurality of screw sets that are connected to said first and second halves to fasten the same together,
said accessory fasteners being interlocked respectively with said fastening portions of said coupling members, wherein, when said screw sets are set loose, each of said at least three coupling members is slidable along and changeable in position on the corresponding one of said backbone sections so as to be aligned and interlocked with a respective one of said accessory fasteners, wherein, when said screw sets are tightened up, each of said at least three coupling members is immobilized, and said at least one vehicle accessory is positioned to said backbone member, and wherein said backbone member and said front and rear wheel connecting members cooperatively define a vehicle body area thereamong, and said at least one vehicle accessory is a vehicle shell covering said vehicle body area.

9. The vehicle frame as claimed in claim 8, wherein:
each of said accessory fasteners has a resilient barb element; and
each of said first and second sleeve halves has an arcuate middle part and two lateral flanges respectively projecting from two opposite ends of said arcuate middle part, said screw sets being attached to said lateral flange members of said first and second sleeve halves, said fastening portion being a receptacle member projecting radially from said arcuate middle part of said first sleeve half to receive and to interlock with said resilient barb element.

10. A vehicle frame for mounting a front wheel set, a rear wheel set, and at least one vehicle accessory, said vehicle frame comprising:
a frame body including
a front wheel connecting member for mounting the front wheel set,
a rear wheel connecting member disposed behind said front wheel connecting member for mounting the rear wheel set, and
a backbone member interconnecting said front and rear wheel connecting members and having a plurality of backbone sections interconnected to each other; and
a coupling device including at least three coupling members that are mounted to said frame body and that are non-collinearly disposed for mounting the at least one vehicle accessory;

wherein each of said at least three coupling members is operable to switch between a mobile state and a stationary state, each of said at least three coupling members being movable relative to said frame body in the mobile state, and being immobilized relative to said frame body in the stationary state; and wherein each of said at least three coupling members is mounted to a corresponding one of said backbone sections, and is operable to switch between a mobile state and a stationary state, each of said coupling members being movable along the corresponding one of said backbone sections in the mobile state, and being immobilized relative to the corresponding one of said backbone sections in the stationary state.

* * * * *